United States Patent [19]

Cinquino

[11] Patent Number: 4,855,966
[45] Date of Patent: Aug. 8, 1989

[54] METHOD AND APPARATUS FOR MONITORING BRIDGE STRUCTURES FOR SCOURING

[76] Inventor: John Cinquino, 2302 Cayuga Rd., Schenectady, N.Y. 12309

[21] Appl. No.: 109,494

[22] Filed: Oct. 16, 1987

[51] Int. Cl.$^4$ .................................. G01S 15/08
[52] U.S. Cl. ............................ 367/99; 367/908; 73/290 V; 33/713
[58] Field of Search .............. 367/99, 118, 908; 181/123, 124; 73/290 V, 296; 340/621; 405/15; 33/126.7 R, 126.7 A, 169 B, 126.4, 126.5, 126.6

[56] References Cited

U.S. PATENT DOCUMENTS

| | | |
|---|---|---|
| 812,269 | 2/1906 | Horton . |
| 2,722,835 | 11/1955 | Ragland ........................ 73/312 |
| 2,869,108 | 1/1959 | Smith, Jr. . |
| 3,184,969 | 5/1965 | Bolton ......................... 367/902 |
| 3,534,477 | 10/1970 | Nahas ............................ 33/1 |
| 3,617,996 | 11/1971 | Herbert ....................... 367/112 |
| 3,942,149 | 3/1976 | Westfall, Jr. ................. 367/108 |
| 4,122,429 | 10/1978 | Hatai . |
| 4,161,885 | 7/1979 | Sack et al. ................... 367/902 |
| 4,571,121 | 2/1986 | Albert ......................... 405/15 |
| 4,717,286 | 1/1988 | Loer ............................ 405/15 |

Primary Examiner—Thomas H. Tarcza
Assistant Examiner—Daniel T. Pihulic
Attorney, Agent, or Firm—Heslin & Rothenberg

[57] ABSTRACT

In one embodiment of a technique for monitoring scouring around structural members which are at least partially submerged in the soil bed material at the bottom of a body of water, the distance between a fixed point on the structural member and the topmost portion of the soil bed material near the member is determined and compared to a predetermined value. When scouring occurs, removal of some of the soil bed material results in an increase in the measured distance, which increase can be used to indicate the occurrence of scouring in an appropriate manner, such as by utilizing a display, by recording the data, or even by telecommunicating the data to another location. The distance determination may be made either only when called for or periodically at predetermined times, in order to provide continuous monitoring. In an alternative embodiment, scour monitoring is provided by one or more probes disposed so as to initially rest on top of the soil bed material located near the structural member. When soil bed material is removed by scouring, the probe moves downwardly due to the force of gravity. The probe is further configured so that it remains in its displaced position even if the scoured area is later refilled by the flow pattern of the body of water. The extent of the downward movement of the probe is determined by a commercially available means. As with the first technique, the data thus obtained may be displayed, recorded, or sent to another location.

34 Claims, 4 Drawing Sheets

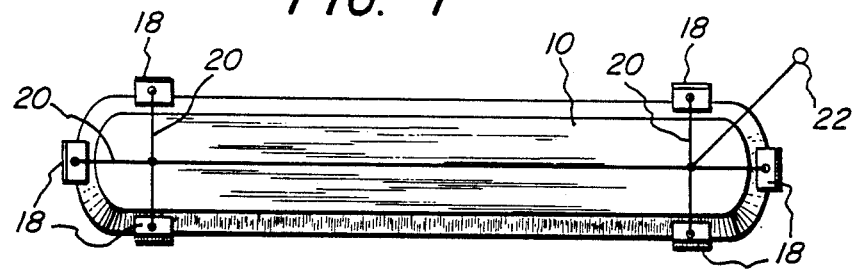
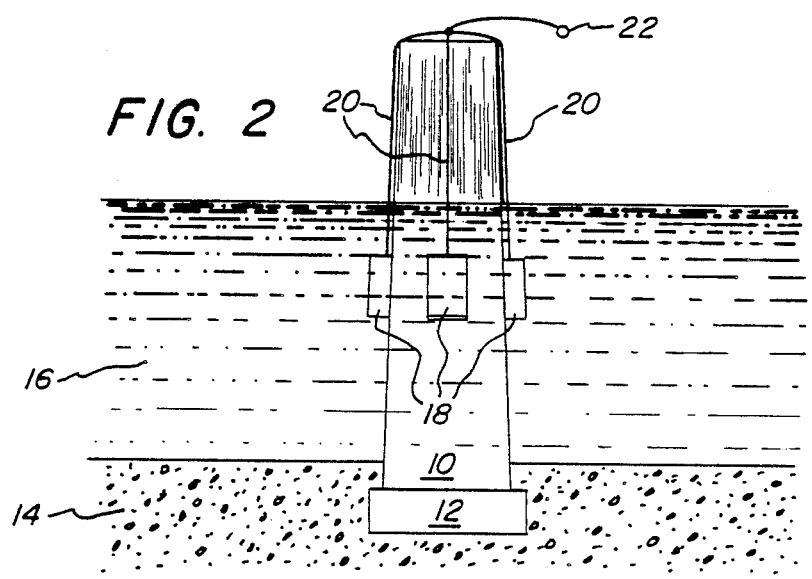
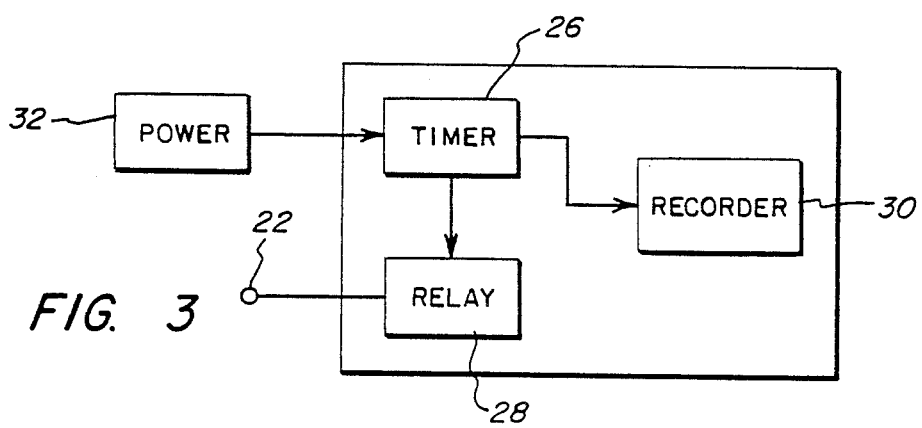

METHOD AND APPARATUS FOR MONITORING BRIDGE STRUCTURES FOR SCOURING

BACKGROUND OF THE INVENTION

This invention relates to monitoring structural members which are at least partially submerged in the soil bed material at the bottom of a body of water, such as bridge piers and footings, for scouring of the soil bed material around the submerged structure. More particularly, it relates to determining when the distance between a fixed point on the structural member and the top of the soil bed material is increased by removal of some of the soil bed material during the scouring process.

As referred to herein, "scouring" is the movement of material in the soil bed of a body of water, which movement is caused by the combination of a high water level and movement of the water at an above normal velocity. Scouring typically occurs in stream and river bottoms during periods such as heavy rainfalls and spring runoffs. Under some conditions, scouring can create cavities having depths of two times the depth of the body of water while the scouring is occurring.

Because many bridges over streams and rivers are supported by piers and abutments which rest on footings which are at least partially submerged in the soil bed of these bodies of water, scouring is a major factor in the safety of these bridges. If the scouring action continues for a long enough period of time, the bridge footings and piers can be undermined to the extent that the bridge structure fails. Because scouring is of such concern, the routine bridge safety inspections that most bridges are periodically subjected to include underwater inspection of the bridge piers and abutments to check for evidence of past or present scouring.

However, past instances of scouring can often go unnoticed even during these underwater inspections. Typically, when the high water level that caused the scouring recedes and the water flow velocity returns to normal, the scoured area is refilled by deposits carried by the receding waters. A soil bed area that has been scoured and then refilled in this manner can appear very similar to a soil bed area that has not been disturbed by scouring, making past instances of scouring very difficult to detect even using periodic underwater inspections. Additionally, even if no scouring had occurred up to the time of the inspection, scouring action could begin the day after the inspection if the water level and flow velocity suddenly increased. Thus, the type of underwater inspections currently employed to monitor scouring are only minimally effective.

Moreover, even though scouring is very evident while it is occurring, underwater inspection of bridge piers and abutments during the water level and flow conditions that exist while the scouring is proceeding is not practical. Not only are such conditions hazardous to the safety of the divers conducting the inspections, but the high water level, high flow velocity, and poor visibility associated with the scouring conditions make it nearly physically impossible to conduct an effective inspection.

Thus, although beneficial steps could be taken to minimize the stresses on the bridge structure during the scouring period and remedial action could be taken to protect the structure after the high water receded, if only scouring could be detected when it was occurring, methods and apparatus for doing so are not presently available.

Accordingly, it is an object of the present invention to provide a method for monitoring scouring around a submerged structural member without requiring underwater inspection.

It is another object of the present invention to provide a scour monitoring method which can be employed to check for scouring as frequently as is required to ensure the safety of the bridge, including the ability to continuously monitor for scouring if necessary.

It is also an object of the present invention to provide a means for detecting the occurrence of scouring even if the scoured area is later refilled.

It is a further object of the present invention to provide apparatus for monitoring scouring which is relatively inexpensive and easy to install and operate.

SUMMARY OF THE INVENTION

In accordance with one aspect of the present invention, a method for monitoring scouring around a structural member which is at least partially submerged in the soil bed material at the bottom of a body of water comprises determining the distance between at least one predetermined fixed point on the structural member and the top portion of the soil bed material. Preferably, a number of such distance determining means are employed and are located around the outer periphery of the structural member so that various areas of the soil bed material surrounding the structure may be monitored. The method of the present invention also includes indicating any change in the measured distance, which change would correspond to removal of a portion of the soil bed material by scouring action. In one embodiment, the distance determination is repeated in a periodic fashion. The distance data thus obtained may also be recorded using any of a number of storage media.

In accordance with another aspect of the present invention, apparatus for monitoring scouring around such structural members as bridge piers comprises means for determining the distance between at least one predetermined fixed point on the structural member and the top portion of the soil bed material at the bottom of the body of water. The apparatus also includes means for indicating a change in the distance measured from a predetermined value. Preferably, the apparatus is further configured so that the distance determinations may be made repetitively, at predetermined times. The apparatus may also include means for recording the data resulting from the distance determinations. In an alternative implementation, the scour monitoring apparatus of the present invention comprises one or more probes disposed so as to rest on top of at least a portion of the soil bed material located near the structural member, which probe is configured to move downwardly due to the force of gravity when the soil bed material is removed by scouring. This latter implementation also includes means for determining the extent of the downward movement of the probe. Preferably, the apparatus further includes a conduit for housing each of the probes, with each conduit being configured with respect to the associated probe so that the probe is constrained within the conduit to substantially slidable movement along the length of the conduit. The means employed for determining the extent of downward movement of the probe may conveniently comprise a cable which is attached at one end thereof to the probe and a cable meter which is connected to the opposite end of the cable.

BRIEF DESCRIPTION OF THE DRAWINGS

The subject matter which is regarded as the invention is particularly pointed out and distinctly claimed in the concluding portion of the specification. The invention itself, however, both as to its organization and its method of practice, together with further objects and advantages thereof, may best be understood by reference to the following description taken in conjunction with the accompanying drawings, in which FIGS. 1 and 2 are plan and side elevation views, respectively, schematically illustrating one embodiment of an apparatus for monitoring scouring, in accordance with the present invention;

FIG. 3 is a block diagram schematically illustrating one embodiment of a means for periodically recording distance data, which may be employed in the present invention;

DETAILED DESCRIPTION OF THE PREFERRED EMBODIMENTS

Figure 4:
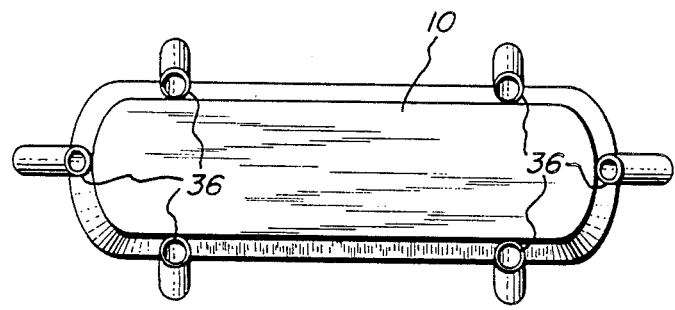
FIGS. 4 and 5 are views similar to those of FIGS. 1 and 2, schematically illustrating another embodiment of an apparatus for monitoring scouring around a structural member, in accordance with the present invention.

FIGS. 1 and 2 schematically illustrate one embodiment of an apparatus for monitoring scouring around a structural member which is at least partially submerged in the soil bed material at the bottom of a body of water. As is shown in FIG. 2, pier 10 and footing 12 comprise a structural member which is at least partially submerged in soil bed 14 located at the bottom of body of water 16. In accordance with the present invention, the monitoring apparatus comprises means for determining the distance between the topmost portion of soil bed 14 and one or more fixed points on pier 10. In order to ensure that all of the likely locations around pier 10 are checked for scouring, it is preferable that a plurality of such fixed points on pier 10 are employed. In the embodiment illustrated in FIG. 1, six fixed points on pier 10 are located around the outer periphery thereof. Located at each fixed point is means 18 for determining the distance between the corresponding fixed point on pier 10 and the topmost portion of soil bed 14. For a typical bridge structure, pier 10 is placed in the body of water so that the flow of water past pier 10 flows either from left to right or from right to left for the orientation shown in FIG. 1. Thus, with distance determining means 18 arranged in the manner shown, the locations around pier 10 where the water flow is most turbulent are each monitored for scouring.

As shown in FIGS. 1 and 2, distance determining means 18 are each attached to pier 10. Each means 18 is connected to wire 22 by connectors 20. Wire 22 is, in turn, connected to means (not shown in FIGS. 1 and 2) for indicating a change in the distance determined by each means 18 from an associated predetermined value. It should be understood that, although locating distance determining means 18 on pier 10 allows means 18 to be vertically aligned with the associated fixed reference point on pier 10, for determining the distance to soil bed 14, it is not necessary to do so. For some applications it may be desirable to locate means 18 nearer to shore, for example, in order to protect the equipment. In such a situation, appropriate measurement techniques and geometrical relationships could be utilized in order to determine the distance from the fixed point on pier 10 and the topmost portion of soil bed 14.

Distance determining means 18 may each conveniently comprise sonar means for sonically determining the distance between soil bed 14 and the associated fixed reference point on pier 10. In one embodiment, each distance determining means 18 comprises a transducer for forming an electrical signal which represents the distance between the transducer and soil bed 14. Each transducer includes means for sending beamed sonic signals through water body 16, means for receiving the sonic echos of the beamed signals which are reflected by soil bed 14, and means responsive to the echo signals for forming the distance-representative transducer signal. Each transducer is located so that it is submerged in water body 16. The optimal submerging depth for a particular application will depend upon the accuracy of the transducers being used, as a function of the distance being measured, and also upon the minimum depth of the body of water. For proper operation, each transducer should be located at an elevation which is below the seasonal low water level of the particular body of water involved.

As mentioned hereinabove, for simplicity of operation of the invention it is preferable that each transducer be affixed to pier 10 and be further disposed so that the transducer's beamed sonic signals are directed substantially vertically toward soil bed 14. With the transducers so configured, each transducer may be operated according to well known sonar principles. A number of such devices are commercially available, including those used as depthfinders in marine applications.

Furthermore, a number of commercially available means may be employed for displaying the distance determined by the transducers and for indicating whether changes in those distances have occurred. In one embodiment, the means employed comprises means for comparing the distance measured by distance determining means 18 to the initial distance between the fixed point on pier 10 and the topmost portion of soil bed 14. When transducers are utilized as the distance determining means, the distance-representative signal from each transducer may be compared to an associated predetermined standard to indicate whether a change in elevation of soil bed 14 has occurred. A change in the signals which exceeds the margin of error for the equipment indicates that some portion of soil bed 14 has been scoured away, resulting in an increased distance between the fixed reference point on pier 10 and the remaining topmost portion of soil bed 14. The signal chosen as the predetermined standard may conveniently be chosen from among earlier readings obtained from each transducer, before the scouring began.

The apparatus of the present invention may further comprise means for recording the distance data obtained. FIG. 3 is a block diagram schematically illustrating one embodiment of a timer controlled recording system that may be employed in the present invention. Programmable timer 26 controls both relay 28 and recorder 30. Timer 26 may be programmed to turn the controlled components on and off at predetermined times, so that distance data is obtained and recorded repetitively. Typically, timer 26 would be programmed to operate in a periodic fashion. If, in addition to conveying the distance data from distance determining means 18 to relay 28, connecting wire 22 also includes signals for turning on and off means 18, timer 26 may be further utilized to selectively operate the distance determining means employed. Relay 28 and recorder 30 may be operated either so that the distance data from all of the distance determining means 18 are recorded at the same time, using parallel channels, or so that the data are recorded serially by configuring relay 28 so that the input data signals are serially supplied to recorder 30 one at a time.

Timer 26, relay 28, and recorder 30 may each comprise commercially available components. Recorder 30 conveniently comprises a commercially available depth sounder of the type having a removable tape on which the data is recorded. A recording system with a removable storage medium is advantageous because it allows the data to be quickly retrieved from the bridge site and later analyzed by bridge maintenance personnel. Another feature provided by timer 26 is the ability to use the time of the recording, in conjunction with data readings which indicate scouring has occurred, to determine when the scouring occurred. Additionally, power source 32 may comprise either AC line voltage or DC power from storage batteries. If either the timer controlled recording system or the distance determining means is operable only from one or the other of these two sources of power, commercially available power converters can be utilized to convert from the type of power source that is available to that which is needed for the equipment being used.

Although not shown in FIGS. 1 and 2, the apparatus of the present invention may further comprise a sonic signal reflecting surface associated with each transducer, for monitoring the associated transducer's distance-representative signal for the occurrence of signal drift over time. The reflecting surface is disposed in the path of the beamed sonic signals at an orthogonal angle to the beam, and is located at a fixed known distance from the transducer. The signal reflected from the reflecting surface may be used to periodically calibrate the readings received from the transducer in accordance with this known distance. For some applications, it may be necessary to do so in order to prevent false indications of scouring when the transducer signals drift over time.

Figure 5:
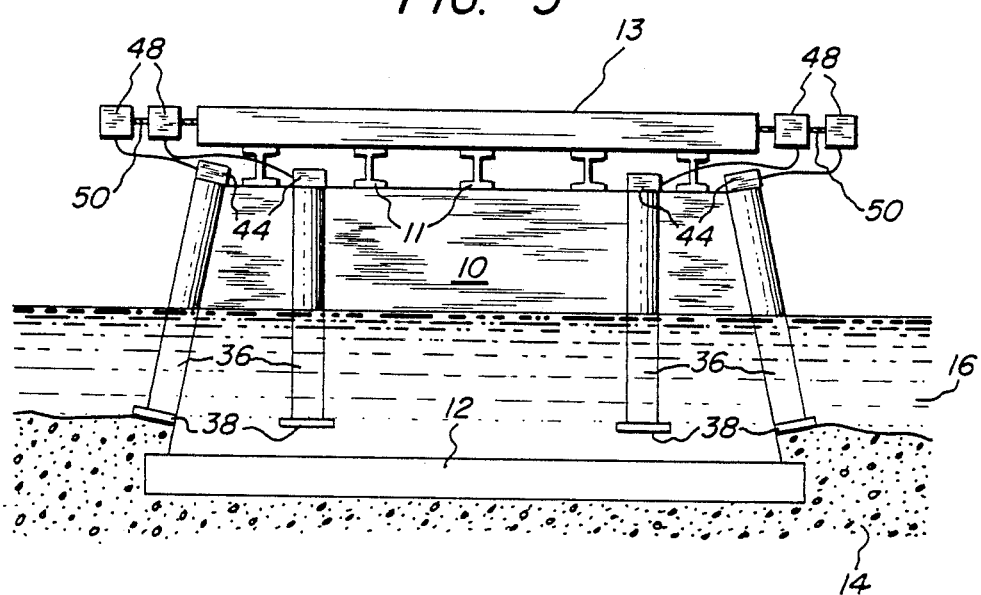
Figure 6:
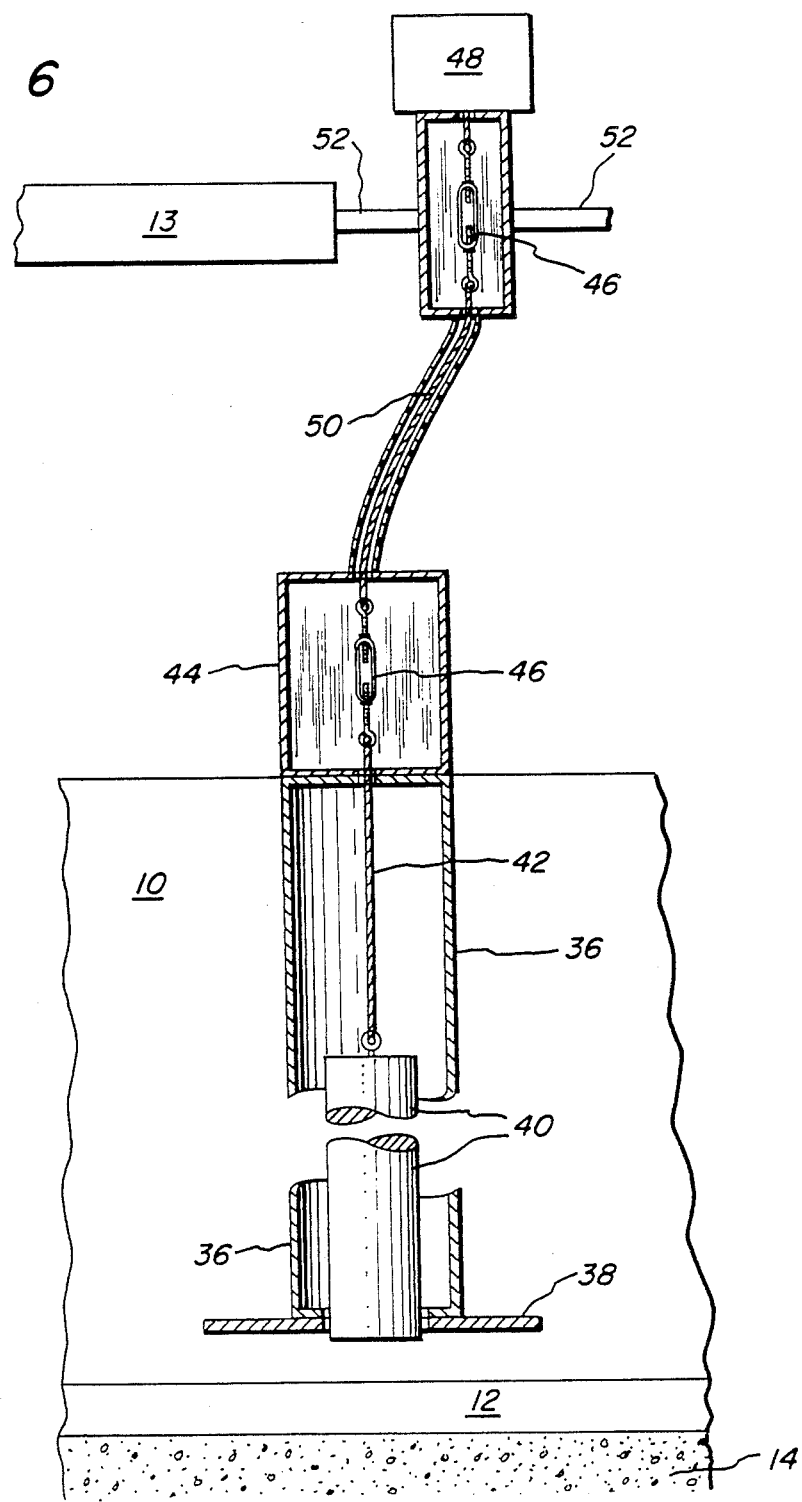
FIG. 6 is a side elevation, partial cross-sectional view schematically illustrating one embodiment of a probe and conduit arrangement that may be employed in the present invention.

FIGS. 4-6 schematically illustrate an alternative embodiment to that described above, in accordance with the present invention. As shown in FIG. 6, in this alternative embodiment, the monitoring apparatus comprises at least one probe 40 disposed so as to rest on top of at least a portion of soil bed 14, which portion of soil bed 14 is located nearby pier 10. Probe 40 is further disposed so as to move downwardly due to the force of gravity thereon when a portion of soil bed 14 is removed by scouring. The apparatus also includes means for determining the extent of the downward movement of probe 40. Preferably, the apparatus further comprises conduit 36 which provides a housing for probe 40, with there being as many conduits 36 as there are probes 40.

Each conduit 36 is disposed so that one end thereof is positioned at the location of soil bed 14 which is to be monitored for scouring. Each probe 36 is further disposed with respect to associated probe 40 so that probe 40 is constrained within conduit 36 to substantially slidable movement along the length of conduit 36.

For the same reasons as were discussed hereinabove in relation to distance determining means 18 shown in FIGS. 1 and 2, it is preferable that a plurality of conduits 36 and associated probes 40 be located around the periphery of pier 10, in the manner illustrated in FIGS. 4 and 5. Also, similarly to the orientation of distance determining means 18, each conduit 36 preferably extends generally vertically upwardly from soil bed 14. Each conduit 36 is further disposed with respect to the associated probe 40 so that probe 40 is constrained to substantially vertical movement within conduit 36. In the embodiment shown in FIGS. 4-6, each conduit 36 is affixed to pier 10. FIG. 5 further illustrates that, in one embodiment, conduits 36 and the associated apparatus components are configured to fit in the space where I-beams 11 separate bridge deck 13 from bridge pier 10.

In the particular embodiment of FIGS. 4-6, base plate 38 is disposed at the end of conduit 36 so as to facilitate placement of conduit 36 near the uppermost portion of soil bed 14. Although not visible in the drawings, base plate 38 has an aperture defined therethrough, through which aperture probe 40 extends downwardly when the soil bed material located thereunder is scoured away. To ensure that probe 40 can extend downwardly for a significant distance without descending entirely below base plate 38, and thereby ensure that probe 40 is constrained to substantially vertical movement, probe 40 is preferably elongated in shape. Probe 40 may be made of a wide variety of materials, as long as the material chosen is not bouyant. Of course, heavier probes will provide more assurance that the probe will descend and remain in a lowered position when the soil bed material under the probe is scoured away. Also, in order to help prevent probe 40 from being pushed upwardly in the event that the scoured area is refilled, probe 40 may be shaped so that resistance to upward movement of the probe through the refilled material is greater than resistance to downward movement therethrough. In one embodiment, conduit 36 comprises a hollow tube having a generally circularly shaped cross section, and probe 40 comprises a solid cylinder.

One embodiment of a means for determining the extent of downward movement of probe 40 is illustrated in FIG. 6. The movement determining means shown therein comprises cable 42 which is attached at one of its ends to probe 40. The opposite end of cable 42 is connected to means 48 for keeping cable 42 taut while simultaneously allowing downward movement thereof when probe 40 moves downwardly. Means 48 also correlates the downward movement of cable 42 to the corresponding distance of downward movement of probe 40. In the embodiment of FIG. 6, cable 42 is connected to means 48 via turnbuckles 46 and connecting cable 50. Turnbuckles 46 and cable 50 are employed to provide adjustments in the overall cable length, in order to facilitate initial placement of probe 40 against the uppermost surface of soil bed 14 without creating slack in the cable system. Turnbuckle 46 may be enclosed in junction box 44 for easy access during installation of the monitoring apparatus. Means 48 for keeping the cable system taut while also correlating the downward movement thereof with the downward movement of probe 40 is preferably located in a position which is easily accessible to bridge maintenance personnel. In the embodiment shown, means 48 is mounted to bridge deck 13 by means of bracket 52.

Figure 7:
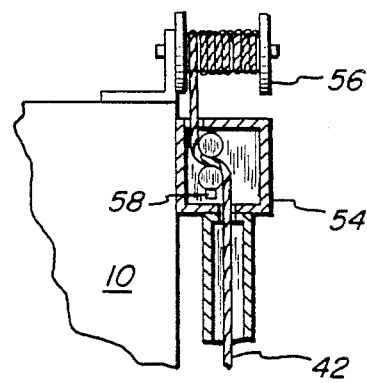
FIGS. 7 and 8 are side and front views, respectively, in partial cross-section schematically illustrating one embodiment of a cable meter that may be utilized in the present invention.
Figure 8:
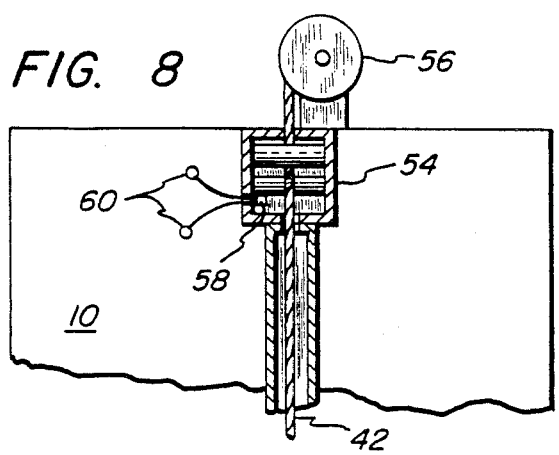

One embodiment for means 48 is schematically illustrated in FIGS. 7 and 8. Cable 42 is attached at one end to probe 40 and is connected at its opposite end to cable meter 54. Cable 42 passes through cable meter 54 and excess cable is stored on pulley 56. Since the length of cable 42 is easily adjustable in this arrangement, turnbuckle 46 and connecting cable 50 are not necessary for the embodiment shown in FIGS. 7 and 8. In a different embodiment, means 48 comprises a spring-action scale which is calibrated to indicate the downward movement of probe 40 when the spring of the scale is stretched. For that type of an arrangement, turnbuckle 46 and connecting cable 50 are very helpful in initializing the apparatus.

As probe 40 descends downwardly, cable 42 also descends downwardly through cable meter 54. Included in cable meter 54 is electric counter 58 which measures the length of the cable passing through cable meter 54. Thus, in the embodiment shown in FIGS. 7 and 8, counter 58 measures the extent of downward movement of probe 40 directly, in a 1:1 ratio, and no further correlation is necessary. However, if it is desirable for a particular application, this 1:1 ratio may be changed by passing cable 42 through an appropriate pulley system. The length-representative electrical signal from counter 58 is sent out of cable meter 54 by means of electrical connectors 60. In an alternative embodiment to that shown, pulley 56 is replaced with a spring loaded pulley and cable meter 54 is replaced by what is known as a "proximity switch" counter. Such a counter typically uses graduations marked on the cable to signal a switch located nearby as each graduated length of the cable passes by the proximity switch.

Figure 9:
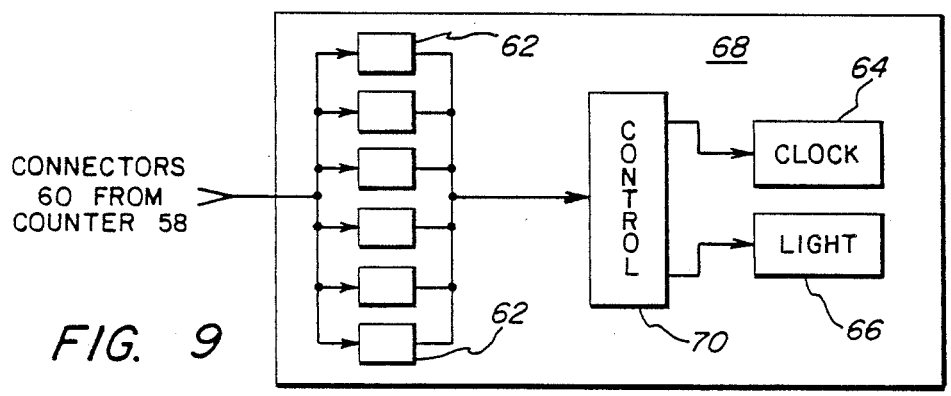
FIG. 9 is a block diagram schematically illustrating the type of data display panel that may be used to display the data obtained from the cable meter shown in FIGS. 7 and 8.

When either a cable meter or a proximity switch counter is utilized to determine the extent of downward movement of probe 40, the length-representative electrical signals being transmitted via electrical connectors 60 for the plurality of probes may be indicated on a common display board, of the type illustrated in FIG. 9 as panel board 68. Panel board 68 contains a plurality of digital electric counters, with the number of counters corresponding to the number of probes 40. Each counter 62 is responsive to the associated length-representative signal being transmitted over electrical connector 60. Panel board 68 may also include circuitry for determining when one of counters 62 indicates that scouring has occurred, and for using such a condition to illuminate warning light 66 and to note the time of occurrence of the scouring indication by means of clock 64. Furthermore, for both the embodiment of the apparatus shown in FIGS. 1-3 and the embodiment shown in FIGS. 4-8, in addition to displaying and/or storing scour monitoring data on-site, the data may be sent by telecommunications equipment from the bridge site to a central office where the data for many such bridge sites can be continually monitored by maintenance personnel.

It may be seen from the above discussion that the method of the present invention comprises determining the distance between at least one predetermined fixed Point on the structural member being monitored for scouring and the topmost portion of the soil bed material in which the structure is partially submerged. The step of determining this distance may be conveniently performed by using sonar techniques. Transducers may be affixed to the bridge piers or abutments and disposed so that the beamed sonic signals are directed substantially vertically downwardly. The resulting distance-representative signals from the transducers may be compared to earlier readings thereof or to a predetermined standard which represents the initial distance between the fixed point on the structural member and the soil bed material. If the readings obtained represent a change from the earlier or initial readings, the change is indicated as an occurrence of scouring. The transducers employed may advantageously be selectively operated so that readings are periodically obtained, and the data obtained may be recorded for later reference and analysis. If necessary, the transducer signals may be monitored for drift by using echoes from a reflecting surface located at a known distance from the transducer.

In an alternative embodiment, the method of the present invention comprises providing a probe disposed so as to rest on top of at least a portion of the soil bed material near the structural member being monitored, with the probe further disposed so as to move downwardly due to the force of gravity when the soil bed material beneath the probe is removed by scouring action. Preferably, the probe is enclosed in a conduit which acts as a housing for the probe and constrains the probe to substantially slidable movement along the length of the conduit. For this embodiment, the inventive method for monitoring scouring includes determining the extent of the downward movement of the probe. This latter step may be performed by attaching a cable to the probe and keeping the cable taut while simultaneously allowing downward movement thereof as the probe moves downwardly, along with correlating the downward movement of the cable to the corresponding distance of downward movement of the probe. In one embodiment, the probe is attached to a cable meter by means of a cable which is attached at one end to the probe and connected at the other end to the cable meter.

The foregoing describes a method and apparatus for monitoring scouring around a submerged structural member, without requiring underwater inspection of the member. The present invention provides a scour monitoring method which can be employed to continually check for scouring, rather than only at widely spaced intervals of time. The invention is therefore capable of detecting scouring even if the scoured area is later refilled. The method of the present invention may be performed even during high water levels and flow velocities. Additionally, the apparatus of the present invention is relatively inexpensive and easy to install and operate.

While the invention has been described in detail herein in accord with certain preferred embodiments thereof, many modifications and changes therein may be effected by those skilled in the art. For example, while conduits 36 have been shown in the figures as having a generally circular cross section, other cross-sectional shapes may also be employed. Accordingly, it is intended by the appended claims to cover all such modifications and changes as fall within the true spirit and scope of the invention.

The invention claimed is:

1. A method for monitoring scouring around a structural member which extends upwardly from a bed of soil material located beneath a body of water, said structural member being at least partially submerged in said soil bed material, said method comprising:

determining the separation distance between at least one predetermined fixed point on said structural member and the uppermost portion of said soil bed material in which said structure is at least partially submerged; and indicating a change in said separation distance for said at least one fixed point from a predetermined value which is associated with said at least one fixed point.

2. The method of claim 1 wherein said distance determining step comprises sonically determining said distance using sonar techniques.

3. The method of claim 2 wherein said step of sonically determining said distance comprises providing at least one transducer located so as to be submerged in said body of water, each said transducer including means for sending beamed sonic signals through said body of water and means for receiving the sonic echoes of said signals from said soil bed material; and operating each said transducer so as to form an electrical signal which represents the separation distance between said transducer and said soil bed material 4. The method of claim 3 wherein said step of providing said at least one transducer further comprises affixing each said transducer to said structural member and further disposing each said transducer so that said beamed sonic signals are directed substantially vertically towards said soil bed material.

5. The method of claim 3 wherein in said indicating step comprises comparing said distance-representative electrical signal from each said transducer to an associated predetermined standard which represents the separation distance between said transducer and said soil bed material when said material is in an unscoured condition.

6. The method of claim 3 wherein each said transducer is operated at predetermined times.

7. The method of claim 3 wherein said indicating step includes recording said distance-representative electrical signal from each said transducer, so as to provide a record of the measured values of said separation distance for each said transducer over a period of time.

8. The method of claim 3 further comprising monitoring each said transducer's distance-representative signal for drift, by providing a sonic signal reflecting surface associated with each said transducer and disposing each said reflecting surface in the path of said beamed sonic signals at a generally orthogonal angle thereto, at a fixed predetermined distance from said transducer.

9. The method of claim 1 wherein said indicating step comprises comparing the distance measured by said distance determining step to the initial distance between said fixed point and said soil bed material.

10. The method of claim 1 wherein said distance is determined periodically.

11. The method of claim 1 further comprising recording said distance between said fixed point and said soil bed material, so as to provide a record of the measured values of said separation distance for each said fixed point over a period of time.

12. A method for monitoring scouring around a structural member which extends upwardly from a bed of soil material located beneath a body of water, said structural member being at least partially submerged in said soil bed material, said method comprising:

providing at least one probe disposed so as to rest on top of at least a portion of the soil bed material located near said structural member and so as to move downwardly due to forces exerted on said probe by the earth's gravitational field when said soil bed material is removed by scouring; and determining the amount of said downward movement of said probe.

13. The method of claim 12 further comprising housing each said probe in a conduit, with the number of said conduits corresponding to the number of said probes, and disposing each said conduit so that one end thereof is positioned at the location of said soil bed material which is to be monitored for scouring and so that the associated probe is constrained within said conduit to substantially slidable movement along the length of said conduit.

14. The method of claim 13 wherein said step of disposing each said conduit further comprises extending each said conduit generally vertically and further disposing each said conduit with respect to the associated probe so that said probe is constrained to substantially vertical movement within said conduit.

15. The method of claim 12 wherein said step of determining the extent of downward movement of said probe comprises:

attaching a cable to said probe;

keeping said cable taut, while simultaneously allowing downward movement of said cable when said probe moves downwardly; and correlating said downward movement of said cable to the corresponding distance of downward movement of said probe.

16. The method of claim 12 wherein said step of determining the amount of downward movement of said probe comprises attaching one end of a cable to said probe and connecting the other end of said cable to a cable meter.

17. Apparatus for monitoring scouring around a structural member which extends upwardly from a bed of soil material located beneath a body of water, said structural member being at least partially submerged in said soil bed material, said apparatus comprising:

means for determining the separation distance between at least one predetermined fixed point on said structural member and the uppermost portion of said soil bed material in which said structure is at least partially submerged; and means for indicating a change in said separation distance for said at least one fixed point from a predetermined value which is associated with said at least one fixed point.

18. The apparatus of claim 17 wherein said distance determining means comprises sonar means for sonically determining said distance.

19. The apparatus of claim 18 wherein said sonar means comprises at least one transducer for forming an electrical signal which represents said distance, each said transducer including means for sending beamed sonic signals through said body of water, means for receiving the sonic echoes of said signals from said soil bed material, and means responsive to said echo signals for forming said distance-representative signal, each said transducer being located so as to be submerged in said body of water.

20. The apparatus of claim 19 wherein each said transducer is affixed to said structural member and is further disposed so that said beamed sonic signals are substantially vertically directed toward said soil bed material.

21. The apparatus of claim 19 wherein said indicating means comprises means for comparing said distance-representative electrical signal from each said transducer to an associated predetermined standard which represents the separation distance between said transducer and said soil bed material when said material is in an unscoured condition.

22. The apparatus of claim 19 further comprising means for selectively operating each said transducer at predetermined times.

23. The apparatus of claim 19 wherein said indicating means includes means for recording said distance-representative electrical signal from each said transducer, so as to provide a record of the measured values of said separation distance for each said transducer over a period of time.

24. The apparatus of claim 19 further comprising a sonic signal reflecting surface associated with each said transducer, for monitoring the associated transducer's distance-representative signal for drift, said reflecting surface being disposed in the path of said beamed sonic signals at a generally orthogonal angle thereto and located at a fixed predetermined distance from said transducer.

25. The apparatus of claim 17 wherein said indicating means comprises means for comparing the distance measured by said distance determining means to the initial distance between said fixed point and said soil bed material.

26. The apparatus of claim 17 wherein said distance determining means is further configured so that said distance may be determined periodically.

27. The apparatus of claim 17 further comprising means for recording said distance between said fixed point and said soil bed material, so as to provide a record of the measured values of said separation distance for each said fixed point over a period of time.

28. Apparatus for monitoring scouring around a structural member which extends upwardly from a bed of soil material located beneath a body of water, said structural member being at least partially submerged in said soil bed material, said apparatus comprising:
   at least one probe disposed so as to rest on top of at least a portion of the soil bed material located near said structural member and so as to move downwardly due to forces exerted on said probe by the earth's gravitational field when said soil bed material is removed by scouring; and
   means for determining the amount of said downward movement of said probe.

29. The apparatus of claim 28 further comprising a conduit for housing each said probe, with the number of said conduits corresponding to the number of said probes, each said conduit being disposed so that one end thereof is positioned at the location of said soil bed material which is to be monitored for scouring and so that the associated probe is constrained within said conduit to substantially slidable movement along the length of said conduit.

30. The apparatus of claim 29 wherein each said conduit extends generally vertically and is further disposed with respect to the associated probe so that said probe is constrained to substantially vertical movement within said conduit.

31. The apparatus of claim 29 wherein each said conduit is affixed to said structural member.

32. The apparatus of claim 29 wherein said means for determining the amount of downward movement of said probe comprises:
   a cable, said cable being attached at one end thereof to said probe;
   means connected to the opposite end of said cable for keeping said cable taut, while simultaneously allowing downward movement of said cable when said probe moves downwardly; and
   means for correlating said downward movement of said cable to the corresponding distance of downward movement of said probe.

33. The apparatus of claim 28 wherein said means for determining the amount of downward movement of said probe comprises a cable which is attached at one end thereof to said probe and a cable meter which is connected to the opposite end of said cable.

34. The apparatus of claim 28 wherein said probe is elongated in shape.

* * * * *

UNITED STATES PATENT AND TRADEMARK OFFICE
CERTIFICATE OF CORRECTION

PATENT NO. : 4,855,966

DATED : August 8, 1989

INVENTOR(S) : John Cinquino

It is certified that error appears in the above-identified patent and that said Letters Patent is hereby corrected as shown below:

Claim 3, line 2, after "comprises" insert --:--.

Claim 5, line 1, after "wherein" delete --in--.

Claim 13, line 4, after "end" delete --5--.

Claim 15, line 2, "extent" should read "amount".

Claim 32, line 1, "29 should read "28".

Signed and Sealed this

Fifth Day of June, 1990

Attest:

HARRY F. MANBECK, JR.

Attesting Officer     Commissioner of Patents and Trademarks